United States Patent
Cho

(10) Patent No.: US 6,700,633 B2
(45) Date of Patent: Mar. 2, 2004

(54) LIQUID CRYSTAL DISPLAY DEVICE FOR REALIZING A LARGE SURFACE DISPLAY SCREEN

(75) Inventor: Chun-Hyun Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/039,475

(22) Filed: Dec. 31, 2001

(65) Prior Publication Data

US 2003/0122996 A1 Jul. 3, 2003

(51) Int. Cl.⁷ .............................................. G02F 1/1335
(52) U.S. Cl. .......................................... 349/65; 349/67
(58) Field of Search .............................. 349/62, 64, 65, 349/67

(56) References Cited

U.S. PATENT DOCUMENTS

| | | | | |
|---|---|---|---|---|
| 4,659,183 A | * | 4/1987 | Suzawa .................. | 349/67 |
| 5,046,826 A | * | 9/1991 | Iwamoto et al. .......... | 349/65 |
| 5,479,275 A | * | 12/1995 | Abileah .................. | 349/5 |
| 5,929,951 A | * | 7/1999 | Sasakura et al. ......... | 349/62 |
| 6,412,969 B1 | * | 7/2002 | Torihara et al. .......... | 362/31 |
| 6,480,307 B1 | * | 11/2002 | Yang ..................... | 359/15 |
| 2002/0030993 A1 | * | 3/2002 | Itoh ..................... | 362/246 |

FOREIGN PATENT DOCUMENTS

JP  2000-235805 A  *  8/2000  .............  F21V/8/00

* cited by examiner

Primary Examiner—Wael Fahmy
Assistant Examiner—Stephen W. Smoot
(74) Attorney, Agent, or Firm—Cantor Colburn LLP

(57) ABSTRACT

Disclosed is a liquid crystal display device for realizing a large surface display screen. The liquid crystal display device has a light guiding plate formed at least at one portion of a light source for converting a light generated from the light source into a planar light having a uniform luminance and advancing in a first direction. Light control member composed of a semitransparent or an opaque material is formed between the light guiding plate and the light source for preventing the light from directly advancing in the first direction. With improvement of the structure of a light supply unit, the liquid crystal display device can have much simplified construction and be easily manufactured. Also, the light guiding plate can have greatly reduced thickness by forming the light control member, and the liquid crystal display device can have a large surface display screen because a luminance of an image displayed on the screen is uniformly maintained by means of uniformly maintaining the luminance of light emitted the light source.

23 Claims, 7 Drawing Sheets

LIQUID CRYSTAL DISPLAY DEVICE FOR REALIZING A LARGE SURFACE DISPLAY SCREEN

BACKGROUND OF THE INVENTION

1. Field of the Invention

The present invention relates to a liquid crystal display device for realizing a large surface display screen, and more particularly to a liquid crystal display device for realizing a large surface display screen by means of enhancing a uniformity of a luminance through a plurality of light supply members.

2. Description of the Related Art

In general, a liquid crystal display device displays an image through a modulation of a light by a liquid crystal cell formed therein, after an orientation of a liquid crystal is changed by applying a voltage and optical characteristics of the liquid crystal such as birefringence, optical activity, bicolor property or scattering are converted into visible variations by means of a specific orientation of the liquid crystal.

The liquid crystal display devices are divided into a twisted nematic (TN) type liquid crystal display device and a super-twisted nematic (STN) type liquid crystal display device. Also, liquid crystal display devices are divided into an active matrix display type including switching devices and a TN liquid crystal, and a passive matrix display type having a STN liquid crystal in accordance with operations of the liquid crystal display devices. A thin film transistor liquid crystal display device (TFT-LCD) has thin film transistors (TFT) as the switching devices, and the thin film transistor liquid crystal display device is widely utilized for a monitor because the thin film transistor liquid crystal display device has a simplified construction.

The liquid crystal display device generally has a liquid crystal display panel including a liquid crystal for determining a transmissivity of a light after receiving an electrical signal. A back light assembly is installed at a rear face of the liquid crystal display panel of the liquid crystal display device because the liquid crystal display device is a passive device that does not emit a light for itself.

A source part and a gate part are formed on the liquid crystal display panel. The source part includes a source driving integrated circuit (IC) for applying image data for displaying an image, and the gate part has a gate driving integrated circuit for applying gate signals for driving thin film transistors formed on the liquid crystal display panel. Image signals applied from an outside are converted into data signals for driving the liquid crystal display panel and the gate signals for driving the thin film transistors through a printed circuit board. Those data and gate signals are applied to the thin film transistors on the liquid crystal display panel via the source and the gate parts. Hence, a liquid crystal of the liquid crystal display panel receives electrical signals, thereby displaying images using lights generated from the back light assembly.

As it is described above, the back light assembly provides the liquid crystal display panel with uniform lights, and the back light assembly has a lamp for generating a light, a light guiding plate for guiding the light from the lamp, and a lamp housing disposed by the side of the light guiding plate for enclosing the lamp.

A cold cathode ray tube is utilized as the lamp. After the light emitted from the lamp passes through a lateral portion of the light guiding plate, and then the light is converted into a planar light using the light guiding plate. A diffusion sheet and a prism sheet are disposed between the light guiding plate and the liquid crystal display panel for maintaining a uniformity of the light inputted into the liquid crystal display device.

Recently, a size of the liquid crystal display device increases according as an electronic apparatus such as a computer or a projection television have large sizes. Also, a dimension of the back light assembly increases in accordance with an augmentation of the size of the liquid crystal display panel. The conventional back light assembly having one light source, however, cannot assure the uniformity of the light for realizing the large surface display screen. Hence, a back light assembly including a plurality of lamps has been developed.

For example, a back light assembly having two lamps is disclosed at U.S. Pat. No. 5,046,826 issued to Ilirofumi Iwamoto et. al.

FIG. 1 is a cross-sectional view showing the back light assembly disclosed at the above U.S. patent.

Referring to FIG. 1, the back light assembly 10 includes a light-transmitting member 15 such as a light guiding plate.

Grooves or holes are formed in a bottom face of the light-transmitting member 15, and the grooves or the holes are formed as hollow spaces for receiving light sources 20. A reflection plate 25 is disposed to enclose the bottom face and lateral portions of the light-transmitting member 15 besides an upper face of the light-transmitting member 15 through which a light passes. The light-transmitting member 15 and the reflection plate 25 are fixed using a housing 30.

A light screen 35 is formed at a portion of the light-transmitting member 15 through which the light passes, and the light screen 35 is composed of an opaque material disposed as a dotted pattern. A light scattering member 40 is formed on the light screen 35, and a liquid crystal display panel 45 is formed on the light scattering member 40 for forming an image.

A light 50 generated from the light source 20 advances through the light-transmitting member 15 toward the light screen 35, and a light 51 downwardly advancing from the light source 20 is reflected by the reflection plate 25, thereby advancing into the light-transmitting member 15. After the lights 50 and 51 are modulated by the light screen 35, the lights 50 and 51 are converted into scattering lights by means of the light scattering member 40, and then inputted into a rear face of the liquid crystal display panel 45.

However, though a large surface display screen may be realized with the back light assembly having the above-mentioned construction, the light-transmitting member 15 should have a thick thickness because the lights inputted into the liquid crystal display device 45 must be uniform. Thus, the back light assembly 10 should have a thick thickness in accordance with an augmentation of the thickness of the light-transmitting member 15.

Also, the lights inputted into the liquid crystal display panel 45 may not be uniform and a quantity of lights directly inputted into the liquid crystal display panel 45 from the light source 20 is larger than that of other portions and an intensity of the lights adjacent to the lamps is larger than that of the other portions.

SUMMARY OF THE INVENTION

The present invention has been made to solve the aforementioned problem, and accordingly it is an object of the present invention to provide a back light assembly including a light guiding plate having a greatly reduced thickness and providing a liquid crystal display panel with a uniform light.

It is another object of the present invention to provide a liquid crystal device realizing a large surface display screen by means of a plurality of light control members in order to enhance a luminance uniformity of a light.

To achieve one object of the present invention, there is provided a liquid crystal display device comprises a back light assembly and a display unit. The back light assembly has a light source for generating a light, a light guiding plate formed at least at one portion of the light source for converting the light generated from the light source into a planar light having a uniform luminance and advancing in a first direction, and a light control member formed between the light guiding plate and the light source for preventing the light from directly advancing in the first direction. The display unit forms an image using the light that advances in the first direction from the light guiding plate.

Preferably, the light control member is comprised of semitransparent or opaque materials, and the light control members have band shapes that are disposed along the first direction.

A groove for receiving the light source is formed at the light guiding plate along in a second direction opposite to the first direction, and the light control members are disposed in the grooves. In this case, the light source is inserted into lamp fixing members installed in the grooves, and is fixed in the lamp fixing member.

In one preferred embodiment of the present invention, a first slope of the light guiding plate formed between the light source and an adjacent light source is smaller than a second slope at the peripheral portion of the light guiding plate from the light sources so that the light guiding plate has a thickness which becomes thinner from the light source. In another preferred embodiment of the present invention, the light guiding plate has a constant thickness without regard to a distance from the light source.

According to the present invention, a liquid crystal display device can have much simplified construction and the liquid crystal display device can be easily manufactured by means of improving a structure of a light supply unit having a back light type. Also, a light guiding plate can have greatly reduced thickness by forming light control members and the light guide plate having a function of a housing over light sources, and the liquid crystal display device can have a large surface display screen because a luminance of an image displayed on the screen can be maintained uniform by means of uniformly maintaining a luminance of light emitted from the light sources without additional reflection members. Furthermore, the light supply unit can have a proper dimension in accordance with a variation of shapes or sizes of the liquid crystal display device because the light supply unit can have various shapes.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, a liquid crystal display device and a back light assembly of the liquid crystal display device according to the preferred embodiments of the present invention will be described in detail with reference to the accompanying drawings.

Figure 1:
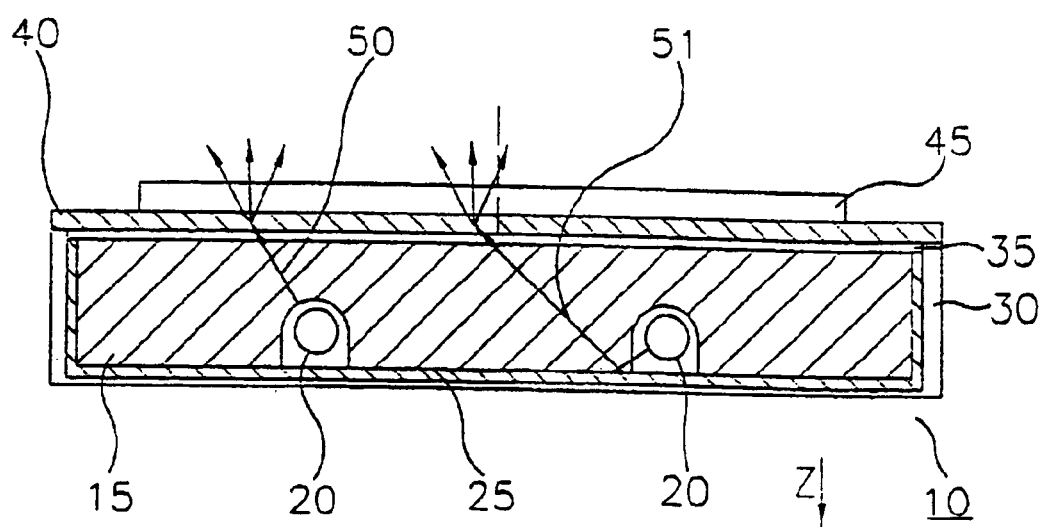
FIG. 1 is a cross-sectional view showing a back light assembly of a conventional liquid crystal display device.
Figure 2:
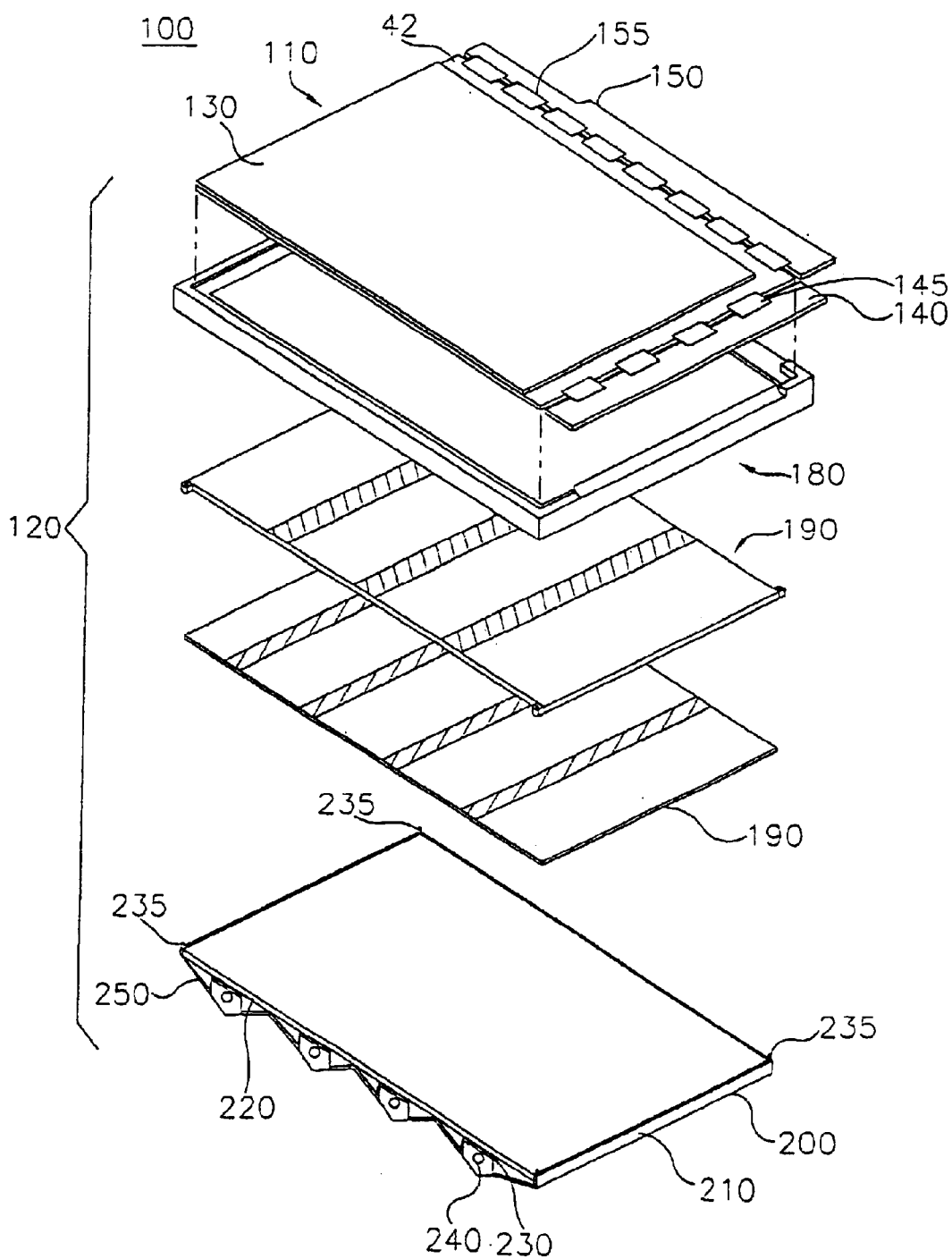
FIG. 2 is an exploded perspective view illustrating a liquid crystal display device according to one preferred embodiment of the present invention.

FIG. 2 is an exploded perspective view illustrating a liquid crystal display device according to one preferred embodiment of the present invention.

Referring to FIG. 2, a liquid crystal display device 100 according to one embodiment of the present invention has a display unit 110 and a back light assembly 120. The display unit 110 displays an image on a screen after receiving an image signal, and the back light assembly 120 supplies the display unit 110 with a light.

The display unit 110 includes a liquid crystal display panel 130, a gate-side printed circuit board (PCB) 140, a gate-side tape carrier package (TCP) 145, a data-side PCB 150, and a data-side TCP 155. The gate-side TCP 145 is a first flexible printed circuit board, and the data-side TCP 155 corresponds to a second flexible printed circuit board.

Figure 3:
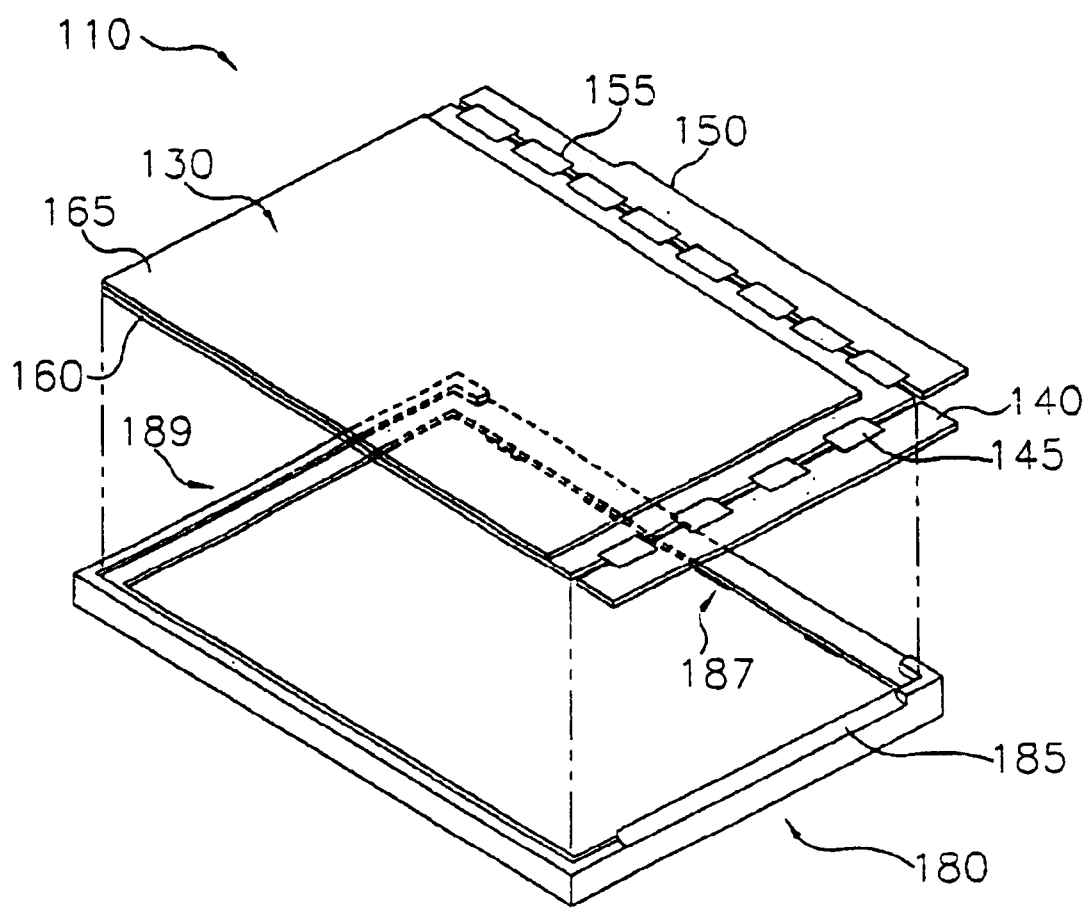
FIG. 3 is an enlarged perspective view showing a display unit of the liquid crystal display device in FIG. 2.

FIG. 3 is an enlarged perspective view showing a display unit of the liquid crystal display device in FIG. 2 in order to particularly illustrate the display unit 110.

Referring to FIGS. 2 and 3, the liquid crystal display panel 130 of the display unit 110 has a thin film transistor substrate 160, a color filter substrate 165, and a liquid crystal (not shown) disposed between the thin film transistor substrate 160 and a color filter substrate 165.

The thin film transistor substrate 160 is composed of a transparent glass substrate on which a plurality of thin film transistors (not shown) is formed in a matrix shape. A data line is connected to source terminals of the thin film transistors of the thin film transistor substrate 160, and a gate line is connected to gate terminals of the thin film transistors of the thin film transistor substrate 160. Also, pixel electrodes are formed on the drain terminals of the thin film transistors, and the pixel electrodes are comprised of a transparent material such as indium tin oxide (ITO).

When electrical signals are applied to the gate and the data lines, the electrical signals are transmitted to the source and the gate terminals of the thin film transistors so that the thin film transistors are turned-on or turned-off in accordance with the electrical signals. Thus, an electrical signal for forming an image is generated from drain terminals of the thin film transistors.

The color filter substrate 165 is provided so as to face the thin film transistor substrate 160. Red•green•blue (R•G•B) pixels are formed on the color filter substrate 165. The R•G•B pixels display predetermined colors when a light generated from a light source passes the R•G•B pixels. A common electrode composed of indium tin oxide is formed on a front face of the color filter substrate 165.

When the thin film transistors are turned-on according as electric powers are applied to the gate and the source terminals of the thin film transistors formed on the thin film transistor substrate 160, predetermined electric fields are formed between the pixel electrodes and the common electrode. An orientation of the liquid crystal injected between the thin film transistor substrate 160 and the color filter substrate 165 is varied in accordance with those electric fields so that a desired image can be obtained according as a transmissivity of the light is changed due to the varied orientation angle of the liquid crystal.

To control the orientation of the liquid crystal and an orientation period of the liquid crystal, a driving signal and a timing signal are applied to the gate and the data lines of the thin film transistors. As shown in FIGS. 2 and 3, the data-side PCB 150 for generating a data driving signal is connected to a source portion of the liquid crystal display panel 130 via the data-side TCP 155, and the gate-side PCB 150 for generating a gate driving signal is connected to a gate portion of the liquid crystal display panel 130 via the gate-side TCP 145.

The gate-side and data-side printed circuit boards 140 and 150 generate the gate driving signal and the data signal for driving the liquid crystal display device 100 after the gate-side and data-side printed circuit boards 140 and 150 receive image signals generated from an outer information process device (not shown) such as a computer. Also, the gate-side and data-side printed circuit boards 140 and 150 generate a plurality of timing signals for timely applying the gate driving and the data signals. The gate driving signal is applied to the gate line of the liquid crystal display panel 130 via the gate-side TCP 145, and the data signal is applied to the data line of the liquid crystal display panel 130 via the data-side TCP 155.

Referring to FIG. 2, the back light assembly 120 is disposed beneath the display unit 110 for applying a uniform light to the display unit 110.

The back light assembly 120 has a display unit fixing member 180, a diffusion member 190, and a light supply unit 200.

Preferably, the display unit fixing member 180 has a shape of a cover for fixing the display unit 110, and the display unit 110 including the liquid crystal display panel 130 is mounted on the display unit fixing member 180. The display unit fixing member 180 will be described in detail.

Figure 4:
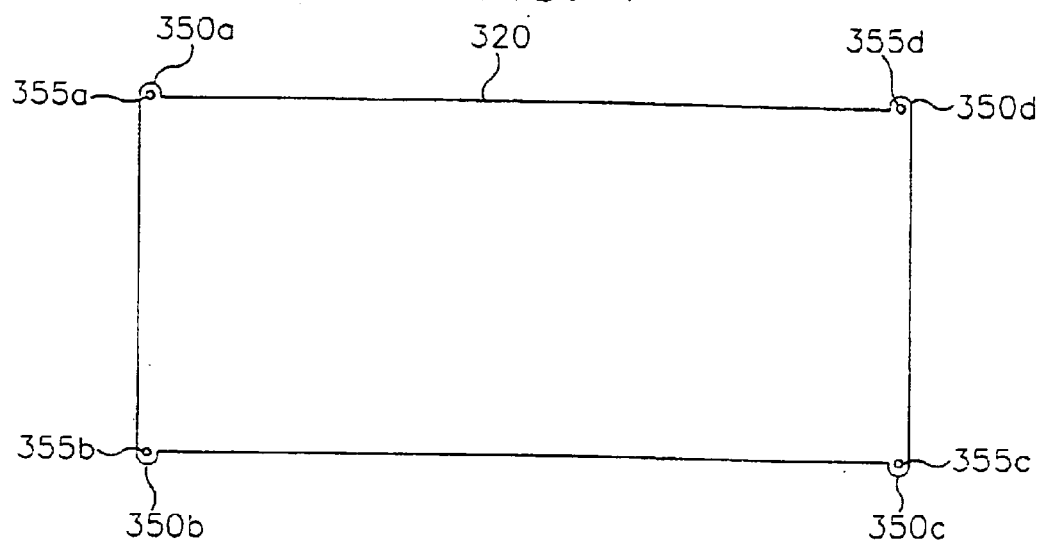
FIGS. 4 and 5 are plan views showing a diffusion member of the liquid crystal display device in FIG. 2.
Figure 5:
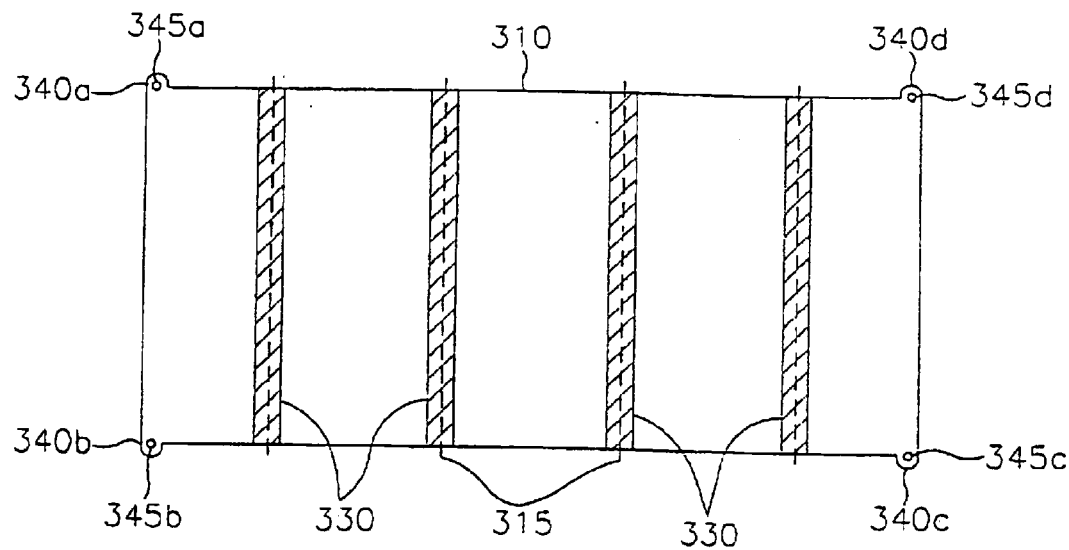

FIGS. 4 and 5 are plan views showing a diffusion member 190 of the liquid crystal display device in FIG. 2.

The diffusion member 190 includes at least one diffusion sheet, preferably three diffusion sheets. The diffusion member 190 is mounted on the light supply unit 200 to cover the whole surface of the light supply unit 200. In this case, the diffusion member 190 is fixed to a housing 210 of the light supply unit 200 so as to receive the light supply unit 200 even though the light supply unit 200 severely moves in left or right directions or the diffusion sheet thermally expands when the diffusion member 190 covers the whole surface of the light supply unit 200. To fix the diffusion member 190 on the housing 210 of the light supply unit 200, bosses 235 for fixing the diffusion member 190 are formed at four upper corners of the housing 210, respectively. A fixing member for fixing the diffusion member 190 includes the bosses 235 of the light supply unit 200, first fixing portions 340a, 340b, 340c and 340d, and second fixing portions 350a, 350b, 350c and 350d. The first and the second fixing portions 340a, 340b, 340c, 340d, 350a, 350b, 350c and 350d are formed at corners of the diffusion member 190. First fixing holes 345a, 345b, 345c and 345d are formed at the first fixing portions 340a, 340b, 340c and 340d, and second fixing holes 355a, 355b, 355c and 355d are formed at the second fixing portions 350a, 350b, 350c and 350d, respectively. At that time, the bosses 235 formed on the housing 210 of the light supply unit 200 have heights sufficiently receiving the diffusion member 190 including the three diffusion sheets.

Referring to FIGS. 4 and 5, the diffusion member 190 has a piece of first diffusion sheet 310, and two pieces of second diffusion sheets 320.

The first diffusion sheet 310 makes contact with an upper face of the light supply unit 200, and the second diffusion sheets 320 are successively mounted on the first diffusion sheet 310.

As shown in FIG. 5, the first diffusion sheet 310 has a function of preventing a non-uniformity of luminance at an interface 315 of several light sources 240 of the light supply unit 200. For performing such a function, a reflection layer 330 is formed on a portion of the first diffusion sheet 310 corresponding to the interface 315 of the light sources 240. The reflection layer 330 is coated by a vapor deposition method or a silk screen print method so that the reflection layer 330 induces an irregular reflection of the light generated form the light sources 240 on the interface 315 of the light sources 240, thereby preventing the luminance non-uniformity.

In addition, the first fixing portions 340a, 340b, 340c and 340d including the first fixing holes 345a, 345b, 345c and 345d are formed on four corner portions of the first diffusion sheet 310 in order to fix the first sheet 310 to the bosses 235. The bosses 235 are inserted into the first fixing hales 345a, 345b, 345c and 345d of the first fixing portions 340a, 340b, 340c and 340d so that the first diffusion sheet 310 is mounted on the supply unit 200.

The second diffusion sheets 320 diffuse the light generated from the light sources 240 and non-uniformly reflected by the first diffusion sheet 310 to enhance a luminance uniformity of the light. The second fixing portions 350a, 350b, 350c and 350d including the second fixing holes 355a, 355b, 355c and 355d are formed on edge portions of the second diffusion sheets 320. The second fixing portions 350a, 350b, 350c and 350d, and the second fixing holes 355a, 355b, 355c and 355d have sizes identical to those of the first fixing portions 340a, 340b, 340c and 340d, and the first fixing holes 345a, 345b, 345c and 345d, respectively.

The bosses 235 are also inserted into the second fixing holes 355a, 355b, 355c and 355d of the second fixing portions 350a, 350b, 350c and 350d so that the second diffusion sheets 320 are mounted on the first diffusion sheet 310. In this case, the first and the second fixing holes 345a, 345b, 345c, 345d, 355a, 355b, 355c and 355d formed in the first and the second fixing portions 340a, 340b, 340c, 340d, 340a, 350b, 350c and 350d are positioned with considering thermal expansions of the first and the second diffusion sheets 310 and 320. That is, the first and the second fixing holes 345a and 355a, which are formed in upper left portions of the first and the second diffusion sheets 310 and 320, are standard fixing holes when an image is straightly displayed on a screen. The standard fixing holes 345a and 355a have enough sizes to be inserted into bosses 235 of the light supply unit 200.

Also, the first and the second fixing holes 345b and 355b, formed in lower left portions of the first and second diffusion sheets 310 and 320, correspond to horizontal holes when the image is straightly displayed on the screen. The first and the second holes 345a and 355a allow the first and the second diffusion sheets 310 and 320 to expand thermally only in a horizontal direction. Meanwhile, other first and second fixing holes 345c, 345d, 355c and 355d formed in right portions of the first and the second diffusion sheets 310 and 320 have sizes wider than those of the bosses 235 in case of straightly display of the image onto the screen.

When the diffusion member 190 including the first and the second diffusion sheets 310 and 320 is combined with the bosses 235 of the light supply unit 200, the diffusion member 190 can be easily separated in a front direction from the light supply unit 200 while the diffusion member 190 can hardly move in the left or the right directions on the light supply unit 200. Therefore, the diffusion member 190 is not separated from the light supply unit 200. In addition, the display unit fixing member 180 is attached to an upper face of the diffusion member 190 so as to fix the display unit 110.

As shown in FIG. 3, the display unit fixing member 180 is formed by connecting frames 185 of clamp shapes to each other in a rectangular shape, and combined with the light supply unit 200. At that time, a combining jaw is preferably formed on the upper face of the housing 210 of the light supply unit 200 or on the upper face of the light guiding plate 220 for combining the frames 185 of the display unit fixing member 180 with each other.

In the meantime, a plurality of pressing pieces 187 are formed in the display unit fixing member 180 in order to prevent the light guiding plate 220 of the light supply unit 200 from being separated toward outside. The pressing pieces 187 partially press portions of the light guiding plate 220. A guide 189 is formed at an outside of the display unit fixing member 180, and the display unit 110 is mounted through the guide 189. In this case, portions of the guide 189 adjacent to the data-side and gate-side printed circuit boards 140 and 150 are opened to bend the gate-side printed circuit board 140 and the data-side printed circuit board 150, respectively.

When the gate-side printed circuit board 140 and the data-side printed circuit board 150 is positioned and bent toward the light sources 240 of the light supply unit 200, thermal deteriorations due to the light sources 240 such as lamps can generate from semiconductor chips formed on the gate-side printed circuit board 140, the data-side printed circuit board 150, the gate-side tape carrier package 145, and the data-side tape carrier package 155. Thus, the gate-side printed circuit board 140 and the data-side printed circuit board 150 are preferably bent toward lateral portions of the light supply unit 200.

Figure 6:
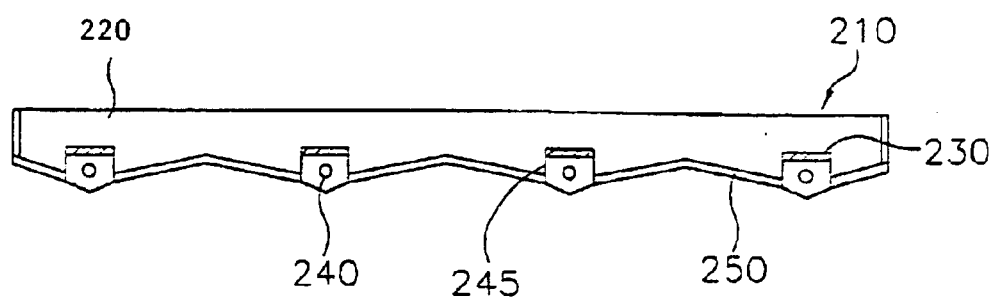
FIG. 6 is an enlarged cross-sectional view illustrating a light supply unit of the liquid crystal display device in FIG. 2.

FIG. 6 is an enlarged cross-sectional view illustrating a light supply unit 200 of the liquid crystal display device in FIG. 2.

Referring to FIGS. 2 and 6, the light supply unit 200 has a housing 210, the light guiding plate 220, a light control member 230, the light sources 240, and a reflection member 250. The light guiding plate 220 is formed adjacent to at least one of the light sources 240, and the light guiding plate 220 converts linear light generated from the light sources 240 into uniform planar light toward the liquid crystal display panel.

On the other hand, the light guiding plate 220 can be used as the housing 210 of the light supply unit 200 through a molding process. At that time, an additional housing 210 is not needed. In one preferred embodiment of the present invention, a plurality of concaves and convexes are formed beneath a lower face of the housing 210, and an upper face of the housing 210 is opened and thus the housing 210 has a rectangular shape.

However, the shape and the size of the housing 210 can be varied according to those of the liquid crystal display device 100. The light guiding plate 220 is separately provided from the housing 210 and mounted on the housing 210. In other case, a lamp fixing member and the light sources 240 are installed after a plurality of grooves are formed beneath of a bottom face of the light guiding plate 220, therefore the light guiding plate 220 can perform a function of the housing 210. In this case, the light control member 230 is positioned between the light guiding plate 220 and the light sources 240, and the light control member 230 has shapes of bands for preventing the non-uniform reflection of the light generated from the light sources 240.

A plurality of grooves are formed beneath portions of the bottom face of the housing 210 or the light guiding plate 220 that functions as the housing 210 where light sources 240 are mounted, and a plurality of protuberances are formed between the grooves. The grooves are downwardly formed by predetermined intervals, and the protuberances are upwardly formed. The light supply unit 200 of the present embodiment can have an additional supporting member (not shown) including a concave and convex structured upper face corresponding to the bottom face of the housing 210 and a plane lower face in order to enhance mounting stability of the housing 210. In the present embodiment, the number of the light sources 240 can be increased or reduced in accordance with the size of the liquid crystal display device 100 or intensities of the light sources although four light sources 240 are shown and described.

A plurality of light sources 240 which are linear lamps are installed in the grooves of the housing 210, and the lamp fixing members 245 are disposed adjacent to the light sources 240 for fixing and protecting the light sources 240. Also, the light control member 230 is mounted over the light sources 240. The lamps including the light sources 240 and the lamp fixing members 245 is detachably mounted on the grooves of the housing 210.

The protuberances of the housing 210 formed between the light sources 240 are protruded by an slope angle of approximately 5~50°. Because intersections of the protuberances become the interfaces 315 of the light sources 240, the reflection layers 330 of the diffusion member 190 are disposed over the intersections of the protuberances.

The light guiding plate 220 is disposed over the light sources 240 and the light control members 230, and reflection members 250 are formed on the bottom face of the housing 210 (in the housing 210) to reflect light emitted from the light sources 240 in lateral and downward directions toward the light guiding plate 220, thereby enhancing a light efficiency of the liquid crystal display device 100.

In the conventional liquid crystal display device, reflection members are symmetrically formed centering around light sources in order to make a uniform luminance. According to the present invention, slopes of the bottom faces of the housing 210 or the light guiding plate 220 need not be symmetric on the basis of the light sources 240. That is, the distance of outer inclined portions of the housing 210 from the center of the light sources 240 are preferably shorter than that of central inclined portions of the housing 210 from the center of the light sources 240, thereby enhancing the light efficiency of the liquid crystal display device 100. In addition, slopes of the outer inclined portions of the housing 210 is preferably greater than those of the central inclined portions on the basis of the light sources 240 to increase the light efficiency.

Because the protuberances of the housing 210 or the light guiding plate 220 can be asymmetric centering around the light sources 240, the housing 210 or the light guiding plate 220 can be easily manufactured by a molding process. Also, the housing 210 or the light guiding plate 220 can have an appropriate size in accordance with the size of the liquid crystal display device 100.

Figure 7:
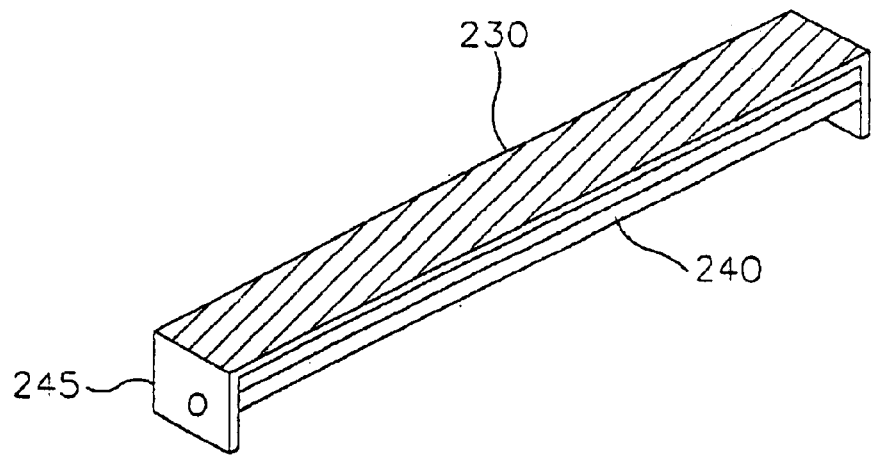
FIG. 7 is an enlarged perspective view showing a light source of the light supply unit in FIG. 6.

FIG. 7 is an enlarged perspective view showing the light source of the light supply unit in FIG. 6.

Referring to FIGS. 6 and 7, lamp fixing members 245 having predetermined widths are mounted on the grooves of the housing 210, and then lamps are inserted into the lamp fixing members 245 from front portions of the lamp fixing members 245 so that the light sources 240 are fixed in the lamp fixing members 245. The light control members 230 are mounted over the light sources 240 in the lamp fixing members 245 in order to uniformly maintain the luminance of light emitted form the light sources 240. The light control members 230 are comprised of semitransparent or opaque materials. The light guiding plate 220 has a thickness much thinner than that of the conventional light guiding plate because the light control members 230 are disposed over the light sources 240. Also, the reflection members 250 may not be installed in the liquid crystal display device 100 of the present invention because the light control members 230 are disposed over the light sources 240 though the reflection members for reflecting light emitted from the light sources must be installed in the conventional liquid crystal display device.

In the liquid crystal display device, a brightness of the liquid crystal display device is visibly recognized concerning its luminance and surface characteristic, and the brightness of the liquid crystal display device generally depends on not measured values but a visual angle of a user. With such a viewpoint, the brightness is a dimensionless physical value, but the luminance represents a brightness degree of the image displayed on the screen of the liquid crystal display device. The luminance is generally indicated with a unit such as $cd/cm^2$, $cd/ft^2$ or nit. The unit of the luminance can be converted by the following equation:

$$1\ cd/cm^2 = 1\ nit = 9.290 \times 0^{-2} cd/ft^2$$

The luminance of the liquid crystal display device is determined by the luminance of the back light and the light permeability of the panel. In general, the light transmissivity of the liquid crystal is low, so a loss of light due to a polarizing plate is approximately 20% in a monochromatic type and a loss of light of the liquid crystal display device having a color filter is reduced to approximately 6 to 7%. To enhance the luminance of the light, there are disclosed several methods such as increasing aperture efficiency, adopting a color filter having a high transmissivity or applying a prism sheet to a back light. A brightness distribution of the light which passes the liquid crystal display panel depends on a thickness distribution of a liquid crystal cell, a transmissivity distribution of a polarization plate, a thickness distribution of a color filter, and a back light. In the liquid crystal display device, the brightness distribution of the liquid crystal display panel can be calculated by measuring the brightness when the liquid crystal display device is in a white state and in a black state.

The brightness distribution of the liquid crystal display device 100 including the back light assembly 120 of the present invention is measured from the screen by a predetermined distance, and then the measured result is compared with that of the conventional liquid crystal display device. A back light assembly including serially disposed three lamps as light sources is adopted as the conventional liquid crystal display device.

Figure 8:
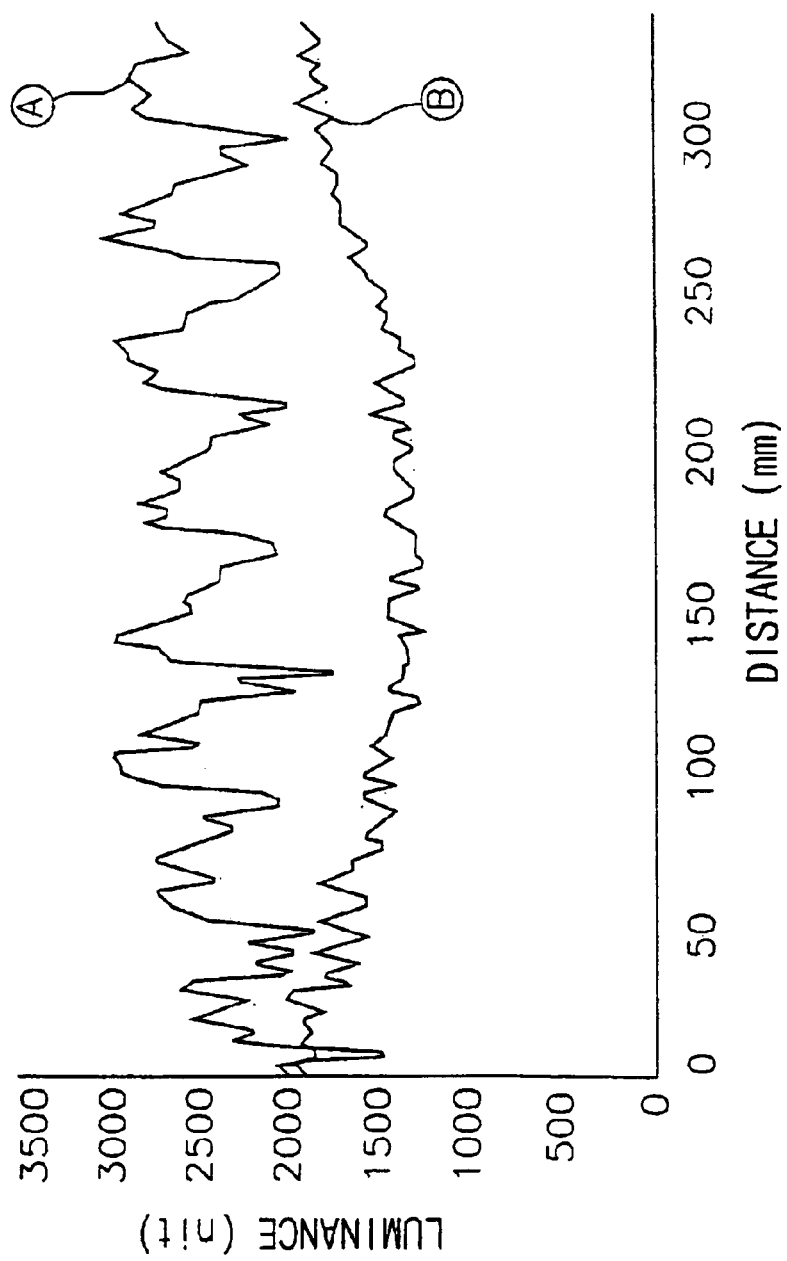
FIG. 8 is a graph showing a luminance distribution of the liquid crystal display device according to one preferred embodiment of the present invention.

FIG. 8 is a graph showing a luminance distribution of the liquid crystal display device according to one preferred embodiment of the present invention. In FIG. 8, an axis of ordinate represents a luminance distribution, and an axis of abscissa indicates a distance from an end of the liquid crystal display panel.

Referring to FIG. 8, a luminance distribution A of the conventional liquid crystal display device and a luminance distribution B of the liquid crystal display device of the present invention B were measured from the screen to a distance of approximately 300 mm with an interval of approximately 50 mm. In the conventional liquid crystal display device, the luminance distribution A was very uneven in accordance with the distance from the screen. In the liquid crystal display device of the present invention, however, the luminance distribution B was uniform without regard to the distance from the screen. When the luminance distribution A was uneven, an image displayed on the screen becomes non-uniform so that the conventional liquid crystal display panel could not realize the large surface display screen. On the other hand, the liquid crystal display device of the present invention sufficiently accomplished the large surface display screen because the luminance distribution B was very uniform and an image displayed on the screen was also uniform though the luminescence of the liquid crystal display device was slightly low.

Figure 9:
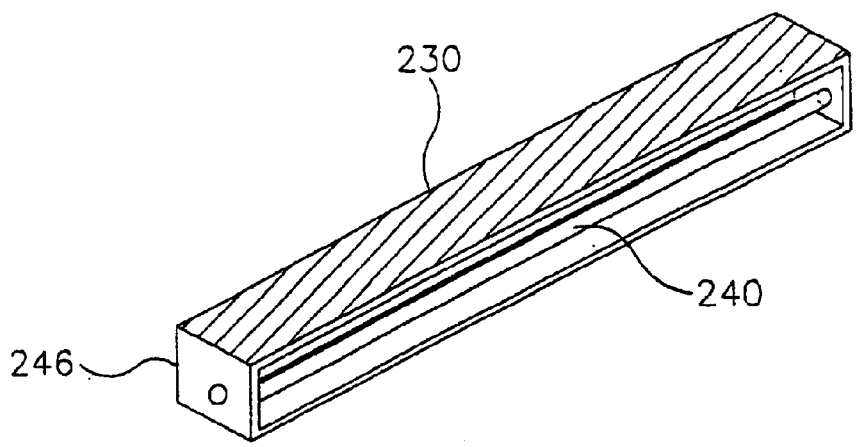
FIG. 9 is an enlarged perspective view illustrating a light source and a member for fixing a lamp according to another preferred embodiment of the present invention.

FIG. 9 is an enlarged perspective view illustrating a light source and a member for fixing a lamp according to another preferred embodiment of the present invention.

As shown in FIG. 9, lamp fixing members 246 have rectangular frame shapes including opened sides and an opened upper face, and lamps as the light sources 240 are inserted into the lamp fixing members 246 from front portions of the lamp fixing members 246 so that the lamps are fixed in the lamp fixing members 246. Light control members 230 are disposed over the light sources 240 to uniformly maintain the luminance of light emitted from the light sources 240.

Figure 10:
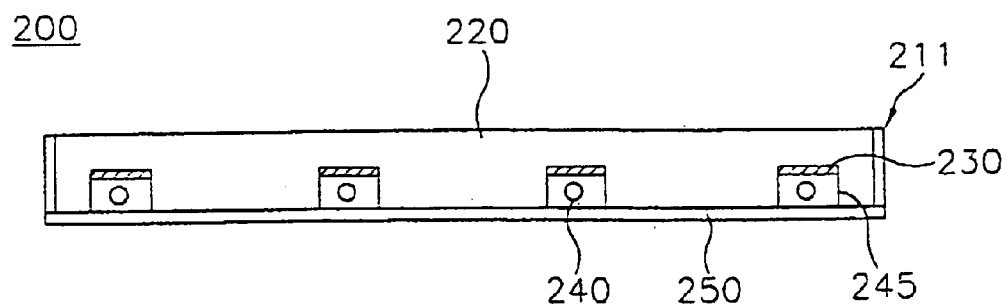
FIG. 10 is a cross-sectional view showing a light supply unit according to still another preferred embodiment of the present invention.

FIG. 10 is a cross-sectional view showing a light supply unit according to still another preferred embodiment of the present invention.

Referring to FIG. 10, a light supply unit 200 according to another preferred embodiment of the present invention has a housing 211 having an even bottom face instead of the concave and convex bottom face described above. In this case, a light guiding plate 220 can be sufficiently function as the housing 211. When the housing 211 or the light guiding plate 220 has the even bottom face, in comparison with the housing 210 having the uneven bottom face, several members can be easily mounted in the housing 211 or the light guiding plate 220, and additional supporting members for a structural stability of the liquid crystal display device is not required.

Lamp fixing members 245 are mounted in the housing 211 by predetermined intervals, and the light sources 240 are installed in the lamp fixing members 245 after the light sources 240 are inserted from front portions of the lamp fixing members 245. As described above, light control members 230 are disposed over the light sources 240, and reflection members 250 are formed on inner lateral sides and the bottom face of the housing 211. In the present embodiment, the reflection member 250 may not be installed in the housing 250 due to the presence of the light control members 230.

According to the present invention, a liquid crystal display device can have much simplified construction, and the liquid crystal display device can be easily manufactured by means of improving a structure of a light supply unit having a back light type.

Also, a light guiding plate can have greatly reduced thickness by forming light control members and the light guide plate having a function of a housing over light sources, and the liquid crystal display device can have a large surface display screen because a luminance of an image displayed on the screen can be maintained uniformly by uniformly maintaining a luminance of light emitted the light sources without additional reflection members.

Furthermore, the light supply unit can have proper dimension in accordance with a variation of shapes or sizes of the liquid crystal display device because the light supply unit can have various shapes.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display device comprising:
    a back light assembly having:
        a light source for generating a light,
        a light guiding plate for converting the light generated from the light source into a planar light having a uniform luminance distribution, the light guiding plate having a groove for receiving the light source,
        a fixing member securing the light source in the groove of the light guiding plate, the fixing member being detachably mounted in the groove, and
        a light control member for preventing the light from the light source from being directly incident on the light guiding plate, the light control member being disposed between the light guiding plate and the light source in the groove; and
    a display unit for displaying images using the light provided from the light guiding plate.

2. The liquid crystal display device of claim 1, wherein the light control member is comprised of a semitransparent material or an opaque material.

3. The liquid crystal display device of claim 1, wherein the light control member is formed on the fixing member so that the light control member is detachably disposed in the groove.

4. The liquid crystal display device of claim 1, wherein the groove is formed at a bottom face of the light guiding plate, the bottom face being opposite to an upper face of the light guiding plate through which the light exits toward the display unit.

5. The liquid crystal display device of claim 1, wherein the light source is detachably mounted in the fixing member.

6. The liquid crystal display device of claim 5, wherein the groove has an opening through which the fixing member and the light control member are mounted in or detached from the groove.

7. The liquid crystal display device of claim 1, wherein the bottom of the light guiding plate has inclined portions formed at longitudinal sides of the groove, the inclined portions being planar.

8. The liquid crystal display device of claim 1, further comprising a diffusion member disposed on the light guiding plate, the diffusion member having a reflection layer formed at a position corresponding to the light source so as to prevent a non-uniformity of luminance between an area in which the light source is disposed and an adjacent area to the area.

9. A liquid crystal display device comprising:
    a back light assembly having:
        at least two light sources disposed in parallel for generating light,
        a light guiding plate for converting the light generated from the light sources into planar light having a uniform luminescence distribution, the light guiding plate having at least two grooves for receiving the at least two light sources, respectively,
        at least two fixing members for securing the at least two light sources in the at least two grooves, respectively, the fixing members being each detachably mounted in corresponding one of the grooves, and
        at least two light control members for preventing the light provided from the at least two light sources from being directly incident on the light guiding plate, each of the light control members being disposed between the light guiding plate and corresponding one of the light sources in corresponding one of the grooves; and
    a display unit for displaying images using the light provided from the light guiding plate.

10. The liquid crystal display device of claim 9, wherein the light control members are comprised of a semitransparent material or an opaque material.

11. The liquid crystal display device of claim 9, wherein the light control members are each formed on corresponding one of the fixing members so that the light control members are each detachably disposed in corresponding one of the grooves.

12. The liquid crystal display device of claim 9, wherein the grooves are formed at a bottom of the light guiding plate, the bottom face being opposite to an upper face of the light guiding plate through which the light exits toward the display unit.

13. The liquid crystal display device of claim 9, wherein the grooves each have an opening through which corresponding one of the fixing members and corresponding one of the light control members are mounted in or detached from the corresponding one of the grooves.

14. The liquid crystal display device of claim 9, wherein the bottom of the light guiding plate includes at least one protuberance formed between the at least two grooves, the protuberance having inclined portions formed at longitudinal sides of the grooves, the inclined portions being planar.

15. The liquid crystal display device of claim 9, wherein the light guiding plate has a first thickness at areas at which the grooves are formed and a second thickness at areas surrounding the grooves, the first thickness being smaller than the second thickness and the first and second thicknesses being each constant in the light guiding plate.

16. A back light assembly for providing light to an image display unit, comprising:
    a plurality of light sources for generating light;
    a light guiding plate for receiving the light from the light sources to provide light with uniform luminance distribution to the image display unit, the light guiding plate including a plurality of grooves each for receiving corresponding one of the light sources, wherein the grooves are formed at a bottom face of the light guiding plate, and the bottom face is opposite to an upper face of the light guiding plate through which the light exits toward the image display unit;

a plurality of fixing members each for securing corresponding one of the light sources in corresponding one of the grooves, each of the fixing members being detachably mounted in corresponding one of the grooves, and a plurality of light control members for preventing the light from the light sources from being directly incident on the light guiding plate, each of the light control members being disposed between the light guiding plate and corresponding one of the light sources in corresponding one of the grooves.

17. The back light assembly of claim 16, wherein the light control members are each formed on corresponding one of the fixing members so that the light control members are each detachably disposed in corresponding one of the grooves.

18. The back light assembly of claim 17, further including a housing for receiving the light guiding plate and the fixing members, the housing has openings through each of which corresponding one of the fixing members, corresponding one of the light control members, and corresponding one of the light sources are detachably disposed in corresponding one of the grooves.

19. The back light assembly of claim 18, further including a reflection member disposed between the light guiding plate and the housing, for reflecting light leaked from the light guiding plate.

20. The back light assembly of claim 17, wherein the light guiding plate includes protuberances formed between adjacent grooves at the bottom face of the light guiding plate, the protuberances each including at least one inclined portion having a selected slope with respect to the upper face of the light guiding plate.

21. The back light assembly of claim 17, further including a diffusion member for diffusing light provided from the light guiding plate, the diffusion member including first fixing portions to be combined with second fixing portions, respectively, of the housing to secure the diffusion member in the housing.

22. The back light assembly of claim 21, wherein the first fixing portions are respectively formed at corners of the diffusion member and each have a fixing hole, and the second fixing portions are respectively formed at corners of the housing and each have a boss to be inserted into corresponding one of the fixing holes of the first fixing portions.

23. The back light assembly of claim 21, wherein the diffusion member includes reflection portions for reflecting back the light from the light guiding plate, the reflection portions being formed at areas of the diffusion member corresponding to the grooves receiving the light sources, respectively.

* * * * *